(12) United States Patent
Tzivanis et al.

(10) Patent No.: US 6,533,566 B2
(45) Date of Patent: Mar. 18, 2003

(54) APPARATUS FOR MAKING A GOLF BALL

(75) Inventors: Michael John Tzivanis, Chicopee, MA (US); Eric G. Johnston, Sterling, MA (US); Mario Jarmuzewski, Chicopee, MA (US); Gary P. Mendrala, West Springfield, MA (US); Thomas J. Kennedy, III, Wilbraham, MA (US); Viktor Keller, Enfield, CT (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 4 days.

(21) Appl. No.: 09/812,878

(22) Filed: Mar. 20, 2001

(65) Prior Publication Data

US 2001/0012805 A1 Aug. 9, 2001

Related U.S. Application Data

(63) Continuation-in-part of application No. 09/690,487, filed on Oct. 17, 2000, which is a continuation of application No. 09/040,798, filed on Mar. 18, 1998.

(51) Int. Cl.[7] .................. B29C 45/14; B29C 45/36; B29C 70/70
(52) U.S. Cl. ............... 425/116; 264/328.6; 425/120; 425/129.1; 425/543
(58) Field of Search .................. 425/543, 120, 425/116, 129.1; 264/328.6

(56) References Cited

U.S. PATENT DOCUMENTS

| 2,426,651 | A | * | 9/1947 | Stacy ............... 425/543 |
| 3,395,109 | A | | 7/1968 | Molitor et al. |
| 3,924,989 | A | * | 12/1975 | Althausen et al. ...... 264/45.5 |
| 3,989,568 | A | | 11/1976 | Isaac |
| 4,123,061 | A | | 10/1978 | Dusbiber |
| 4,144,297 | A | | 3/1979 | Tomar .............. 264/45.5 |
| 4,190,711 | A | | 2/1980 | Zdrahala et al. |
| 4,218,543 | A | | 8/1980 | Weber et al. .......... 264/45.5 |
| 4,248,432 | A | | 2/1981 | Hewitt et al. |

(List continued on next page.)

FOREIGN PATENT DOCUMENTS

| JP | 05074827 A | * | 3/1993 |
| WO | WO-00/57962 A1 | * | 10/2000 | ............ 473/354 |

OTHER PUBLICATIONS

A General Reference Manual, "The Chemistry of Polyurethane Coatings," Mobay Corporation, 1–16 (1988).
Cytec Industries, Inc., "TMXDI®(META) Aliphatic Isocyanates," brochure, pp. 2–11, 9/94.
Bayer Corporation, "Engineering Polymers Properties Guide Thermoplastics and Polyurethanes," brochure, pp. 2–7, 28–29, No date.
A Properties Guide, "Engineering Polymers Thermoplastics and Thermosets," Miles Inc., 1–8 (1994).
Polyurethane Handbook, "Chemistry–Raw Materials–Processing Applications–Proeprties," edited by Oertel et al., Hanser/Gardner Publications, Inc., 101,102 (1994).
Bayer Polymer Product Guide, www.polymers–usa.bayer.com/orgs/bayer/unpro/bayflex/mp–10000.htm, 1991–1997.

*Primary Examiner*—Robert Davis

(57) ABSTRACT

An apparatus for making a golf ball is disclosed. The apparatus is a molding assembly for making a golf ball which includes a mold body that defines a molding cavity. The molding cavity is adapted to accommodate and preferably retain a golf ball core during a molding operation of one or more layers about the core. The molding assembly includes at least one material flow inlet, at least one material flow channel extending between and providing fluid communication with a material flow inlet and the molding cavity. At least one portion of the material flow channel has a plurality of bends and at least one branching intersection adapted to promote turbulence in a liquid flowing therethrough. A method of making a golf ball is also disclosed. A golf ball made from the disclosed molding apparatus and/or process is also disclosed.

9 Claims, 7 Drawing Sheets

U.S. PATENT DOCUMENTS

| | | | |
|---|---|---|---|
| 4,361,407 A | * 11/1982 | Pellegrini | 366/340 |
| 4,442,282 A | 4/1984 | Kolycheck | |
| 4,582,887 A | 4/1986 | Dominguez et al. | |
| 4,590,219 A | 5/1986 | Nissen et al. | 264/328.6 |
| 4,607,090 A | 8/1986 | Dominguez | |
| 4,695,055 A | 9/1987 | Newcomb et al. | |
| 4,762,322 A | 8/1988 | Molitor et al. | |
| 4,790,992 A | * 12/1988 | Nishikawa | 425/542 |
| 4,878,674 A | 11/1989 | Newcomb et al. | |
| 4,929,407 A | 5/1990 | Giza | 264/250 |
| 4,957,297 A | 9/1990 | Newcomb et al. | |
| 5,006,297 A | 4/1991 | Brown et al. | 264/275 |
| 5,035,425 A | 7/1991 | Edwards | |
| 5,045,591 A | 9/1991 | Meyer et al. | |
| 5,142,835 A | 9/1992 | Mrocca | |
| 5,147,657 A | 9/1992 | Giza | 425/129.1 |
| 5,150,906 A | 9/1992 | Molitor et al. | 264/248 |
| 5,219,973 A | 6/1993 | Slack et al. | |
| 5,268,183 A | * 12/1993 | Garza | 425/116 |
| 5,334,673 A | 8/1994 | Wu | |
| 5,368,806 A | 11/1994 | Harasin et al. | 264/328.6 |
| 5,484,870 A | 1/1996 | Wu | |
| 5,668,239 A | 9/1997 | Nodelman et al. | |
| 5,688,191 A | 11/1997 | Cavallaro et al. | |
| 5,692,973 A | 12/1997 | Dalton | 473/374 |
| 5,692,974 A | 12/1997 | Wu et al. | 473/377 |
| 5,733,428 A | 3/1998 | Calabria et al. | 264/271.1 |
| 5,739,247 A | 4/1998 | Lesko et al. | |
| 5,739,253 A | 4/1998 | Nodelman et al. | 264/328.6 |
| 5,743,816 A | 4/1998 | Ohsumi et al. | 473/376 |
| 5,750,580 A | 5/1998 | Mayer et al. | |
| 5,779,562 A | 7/1998 | Melvin et al. | 473/373 |
| 5,782,707 A | 7/1998 | Yamagishi et al. | 473/374 |
| 5,797,808 A | 8/1998 | Hayashi et al. | 473/364 |
| 5,803,831 A | * 9/1998 | Sullivan et al. | 473/373 |
| 5,813,923 A | 9/1998 | Cavallaro et al. | 473/373 |
| 5,830,087 A | 11/1998 | Sullivan et al. | |
| 5,837,183 A | 11/1998 | Inoue et al. | 425/547 |
| 5,849,168 A | 12/1998 | Lutz | 264/279.1 |
| 5,849,237 A | 12/1998 | Inoue | 425/556 |
| 5,879,599 A | 3/1999 | Inoue et al. | 264/278 |
| 5,929,189 A | 7/1999 | Ichikawa et al. | 473/371 |
| 5,965,669 A | 10/1999 | Cavallaro et al. | 473/372 |
| 6,042,361 A | * 3/2000 | Murphy | 425/546 |
| 6,083,119 A | * 7/2000 | Sullivan et al. | 473/354 |
| 6,119,763 A | 9/2000 | Inoue et al. | |
| 6,129,881 A | 10/2000 | Puniello | |
| 6,336,871 B1 | 1/2002 | Ihara et al. | |

* cited by examiner

APPARATUS FOR MAKING A GOLF BALL

CROSS REFERENCE TO RELATED APPLICATIONS

This is a continuation-in-part application from U.S. application Ser. No. 09/690,487 filed on Oct. 17, 2000, which is a continuation application of U.S. application Ser. No. 09/040,798 filed on Mar. 18, 1998.

FIELD OF THE INVENTION

The present invention pertains to the art of making golf balls, and, more particularly, to a new die configuration for use in reaction injection molding of golf ball layers and covers.

BACKGROUND OF THE INVENTION

Golf balls are typically made by molding a core of elastomeric or polymeric material into a spheroid shape. A cover is then molded around the core. Sometimes, before the cover is molded about the core, an intermediate layer is molded about the core and the cover is then molded around the intermediate layer. The molding processes used for the cover and the intermediate layer are similar and usually involve either compression molding or injection molding.

In compression molding, the golf ball core is inserted into a central area of a two piece die and pre-sized sections of cover material are placed in each half of the die, which then clamps shut. The application of heat and pressure molds the cover material about the core.

Blends of polymeric materials have been used for modern golf ball covers because certain grades and combinations have offered certain levels of hardness, to resist damage when the ball is hit with a club, and elasticity, to allow responsiveness to the hit. Some of these materials facilitate processing by compression molding, yet disadvantages have arisen. These disadvantages include the presence of seams in the cover, which occur where the pre-sized sections of cover material were joined, and high process cycle times which are required to heat the cover material and complete the molding process.

Injection molding of golf ball covers arose as a processing technique to overcome some of the disadvantages of compression molding. The process involves inserting a golf ball core into a die, closing the die and forcing a heated, viscous polymeric material into the die. The material is then cooled and the golf ball is removed from the die. Injection molding is well-suited for thermoplastic materials, but has limited application to some thermosetting polymers. However, certain types of these thermosetting polymers often exhibit the hardness and elasticity desired for a golf ball cover. Some of the most promising thermosetting materials are reactive, requiring two or more components to be mixed and rapidly transferred into a die before a polymerization reaction is complete. As a result, traditional injection molding techniques do not provide proper processing when applied to these materials.

Reaction injection molding is a processing technique used specifically for certain reactive thermosetting plastics. As mentioned above, by "reactive" it is meant that the polymer is formed from two or more components which react. Generally, the components, prior to reacting, exhibit relatively low viscosities. The low viscosities of the components allow the use of lower temperatures and pressures than those utilized in traditional injection molding. In reaction injection molding, the two or more components are combined and react to produce the final polymerized material. Mixing of these separate components is critical, a distinct difference from traditional injection molding.

The process of reaction injection molding a golf ball cover involves placing a golf ball core into a die, closing the die, injecting the reactive components into a mixing chamber where they combine, and transferring the combined material into the die. The mixing begins the polymerization reaction which is typically completed upon cooling of the cover material.

The present invention provides a new mold or die configuration and a new method of processing for reaction injection molding a golf ball cover or inner layer which promotes increased mixing of constituent materials, resulting in enhanced properties and the ability to explore the use of materials new to the golf ball art.

SUMMARY OF THE INVENTION

In accordance with one embodiment of the present invention, an apparatus for making a golf ball is provided. The apparatus is a mold for making a golf ball which includes a body and a cavity defined within the body for retaining a golf ball core. The mold provides a molding cavity, at least one material flow inlet, and at least one material flow channel providing fluid communication between the molding cavity and the material flow inlet. The mold additionally provides at least a portion of the material flow channel having a plurality of bends and at least one branching intersection that promotes turbulence in a liquid molding material flowing therethrough.

In accordance with another embodiment of the present invention, a method of making a golf ball is provided. The method includes providing a molding assembly including a mold defining a molding cavity adapted to receive a golf ball core and a material flow channel providing fluid communication between the molding cavity and a source of flowable molding material. The material flow channel has at least one turbulence-promoting fan gate. The method further includes obtaining a golf ball core, positioning the core within the molding cavity, and introducing an effective amount of the flowable molding material through the material flow channel and into the molding cavity thereby causing the flowable molding material to pass through the turbulence-promoting fan gate and forming a layer of the molding material about the core.

In accordance with another embodiment of the present invention, a golf ball is provided. The golf ball includes a core and at least one layer formed from a reaction injected molded material surrounding the core. The layer preferably has a thickness of about 0.015 inches to 0.050 inches.

One advantage of the present invention is that the constituent materials are mixed thoroughly, thereby providing a more consistent intermediate and/or cover layer, resulting in better golf ball performance characteristics.

Another advantage of the present invention is that the use of new, lower viscosity materials may be explored, resulting in enhanced golf ball properties and performance.

Yet another advantage of the present invention is that increased mixing of lower viscosity materials allows the intermediate layer or cover to be thinner, resulting in increased ball performance.

Still another advantage of the present invention is that a unique venting configuration of the mold reduces the porosity of the material being processed, creating a ball cover or other layer that is substantially free from voids.

Still further advantages of the present invention will become apparent to those of ordinary skill in the art upon reading and understanding the following detailed description of the preferred embodiments.

BRIEF DESCRIPTION OF THE DRAWINGS

The following figures are not necessarily to scale, but are merely illustrative of the present invention. Specifically, the figures are for purposes of illustrating various aspects and preferred embodiments of the present invention and are not to be construed as limiting the invention described herein.

DETAILED DESCRIPTION OF THE PREFERRED EMBODIMENTS

Figure 1:
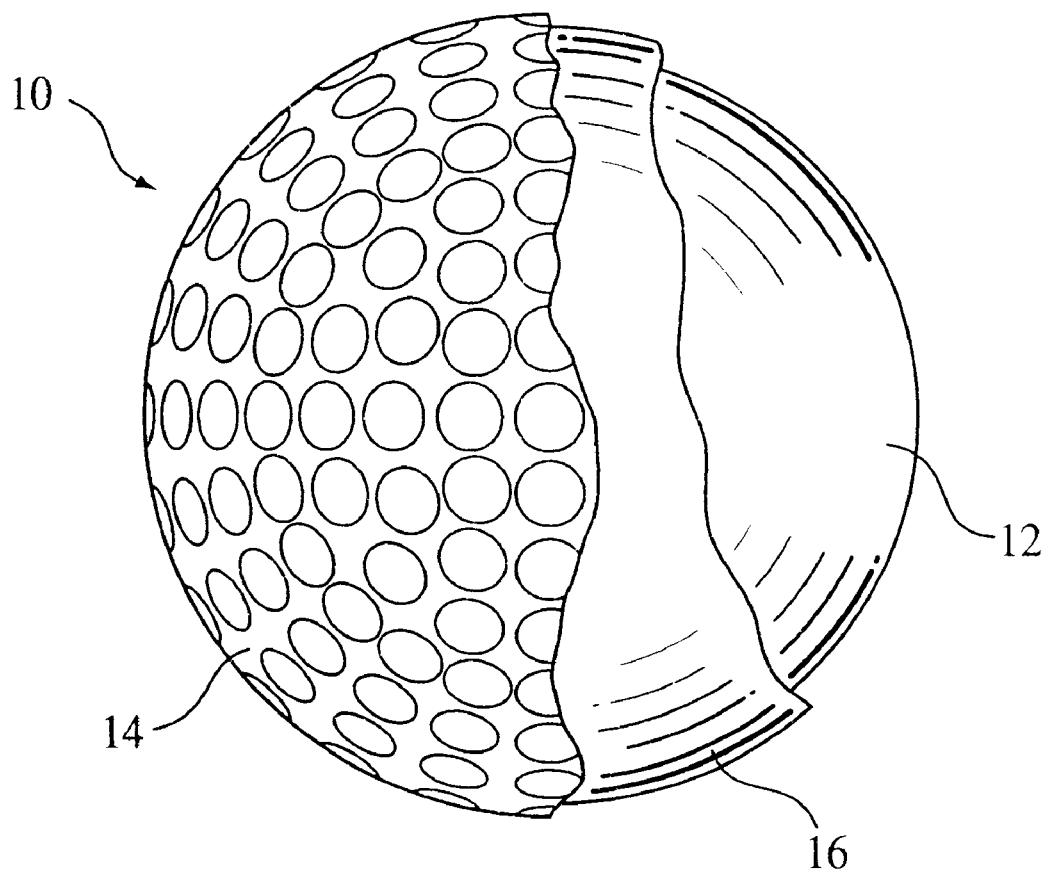
FIG. 1 is a perspective view revealing the components of a preferred embodiment golf ball in accordance with the present invention.

Turning now to the drawings, with reference to FIG. 1, a preferred embodiment golf ball 10 in accordance with the present invention is illustrated. The golf ball 10 includes a central core 12 which may be solid or liquid as known in the art. A cover 14 is surroundingly disposed about the central core 12. An intermediate layer 16 may be present between the central core 12 and the cover 14. The present invention primarily relates to the cover 14 and will be described with particular reference thereto, but it is also contemplated to apply to molding of the intermediate layer 16.

Figure 2:
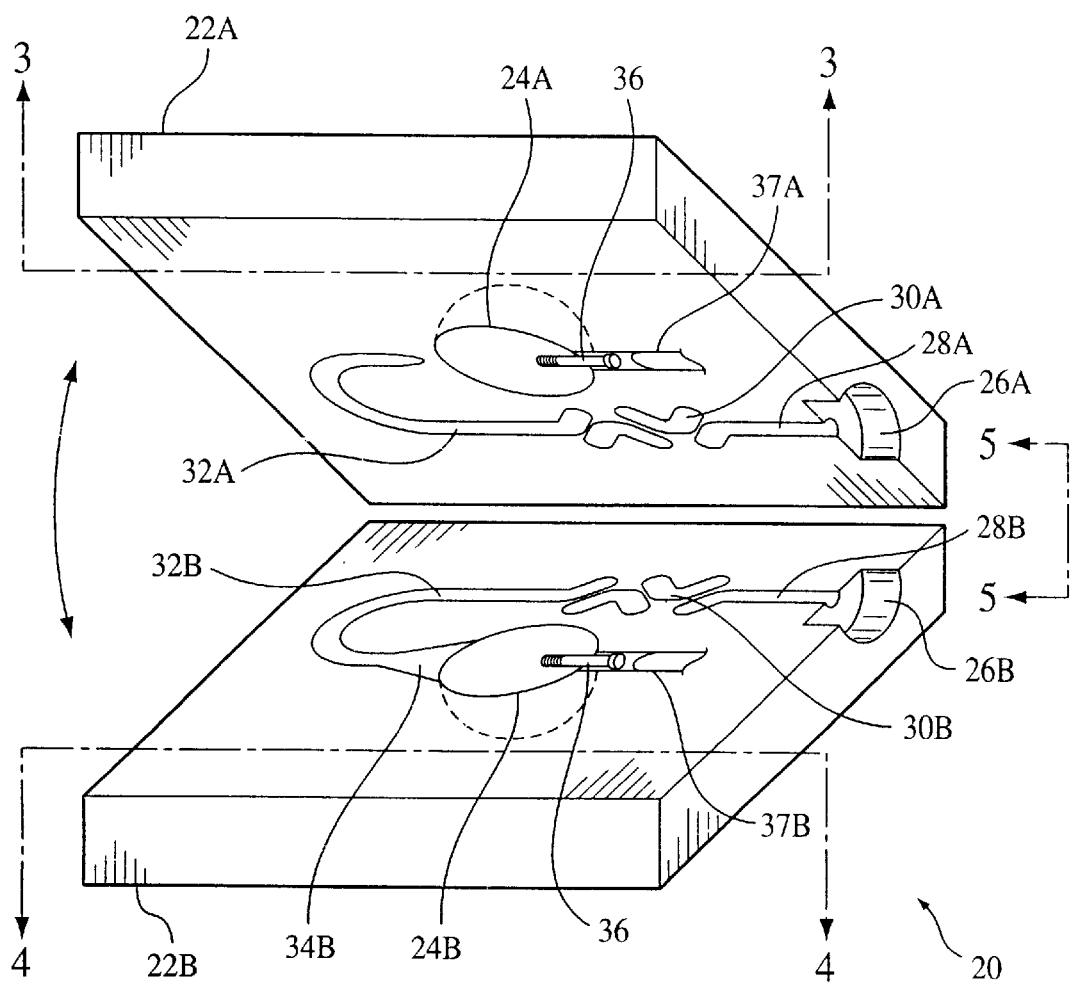
FIG. 2 is a perspective view of a preferred embodiment of a molding assembly in accordance with the present invention.

Turning now to FIG. 2, a perspective view of a preferred embodiment molding assembly in accordance with the current invention is shown. As previously noted, complete and timely mixing of two or more constituent materials is important when using a reaction injection molding ('RIM') process. The preferred embodiment molding assembly 20 provides such mixing as a result of its unique design and configuration. An injection machine, as known in the art, is connected to the preferred embodiment molding assembly 20 which comprises an upper half 22A and a lower half 22B. As will be appreciated, the upper and lower halves 22A and 22B are preferably formed from a metal or suitable alloy. A mixing chamber may, as known in the art, precede the molding assembly 20 if desired. In a further aspect of the present invention, the molding assembly 20 is utilized as follows. A core 12 (referring to FIG. 1) is positioned within a central cavity formed from two hemispherical depressions 24A and 24B defined in opposing faces of the upper half and lower half 22A and 22B, respectively, of the molding assembly 20. As will be appreciated, when the upper and lower halves 22A and 22B are closed, and the cavities 24A and 24B are aligned with each other, the resulting cavity has a spherical configuration. If the molding assembly is for molding a cover layer, each of the hemispherical cavities 24A and 24B will define a plurality of raised regions that, upon molding a cover layer therein, will result in corresponding dimples on the cover layer.

Each upper and lower half 22A and 22B of the preferred embodiment molding assembly 20 defines an adapter portion 26A and 26B to enable the body 20 to connect to other process equipment as mentioned above and leads to a material inlet channel 28A and 28B as illustrated in FIG. 2. As will be understood, upon closing the upper and lower halves 22A and 22B of the molding assembly 20, the separate halves of adapter portion 26A and 26B are aligned with each other and create a material flow inlet within the molding assembly. And, each upper and lower half 22A and 22B of the assembly 20 further defines flow channels 28A and 28B, 30A and 30B and 32A and 32B which create a comprehensive flow channel within the molding assembly when the upper and lower halves 22A and 22B are closed. Specifically, the material flow inlet channel portion 28A, 28B receives the constituent materials from the adapter portion 26A and 26B and directs those materials to a turbulence-promoting portion of the channel 30A, 30B which is configured to form at least one fan gate. The upper and lower mold halves 22A and 22B include complimentary turbulence-promoting fan gate channel portions 30A and 30B, respectively. It will be appreciated that upon closing the upper and lower halves 22A and 22B of the molding assembly 20, the channel portion 30A and 30B defines a region of the flow channel that is generally nonlinear and includes a plurality of bends and at least one branching intersection generally referred to herein as a fan gate. Each fan gate channel portion 30A, 30B is designed to direct material flow along an angular or tortuous path. As will be described in more detail below, when material reaches a terminus of angular flow in one plane of the flow channel in one half, the material flows in a transverse manner to a corresponding fan gate channel portion in the opposing half. Thus, when the constituent materials arrive at the fan gate defined by the channel portion 30A and 30B, turbulent flow is promoted, forcing the materials to continue to mix within the molding assembly 20. This mixing within the molding assembly 20 provides for improved overall mixing of the constituent materials, thereby resulting in a more uniform and homogeneous composition for the cover 14.

Figure 3:
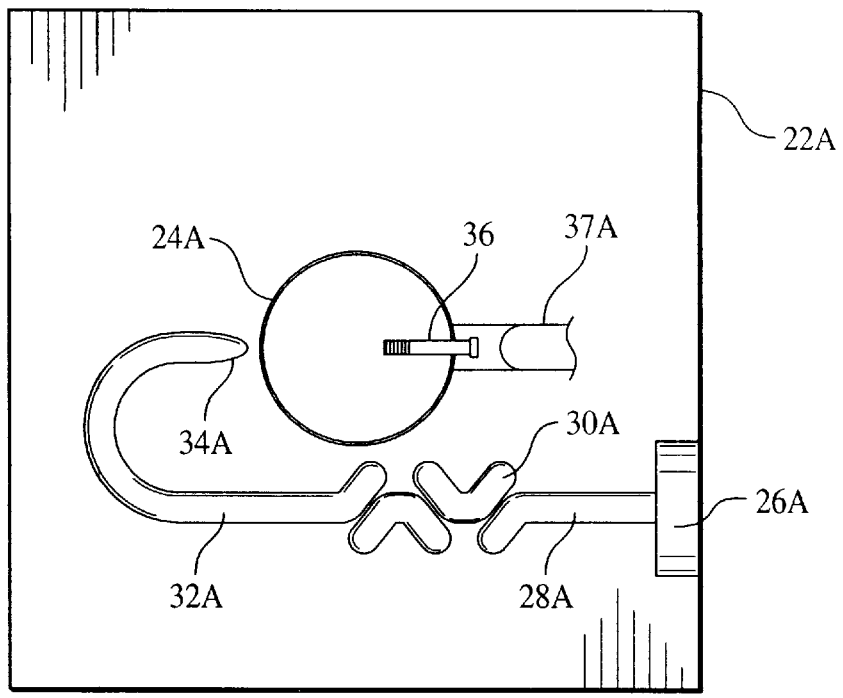
FIG. 3 is a planar view of a portion of the preferred embodiment molding assembly taken along line 3—3 in FIG. 2.
Figure 4:
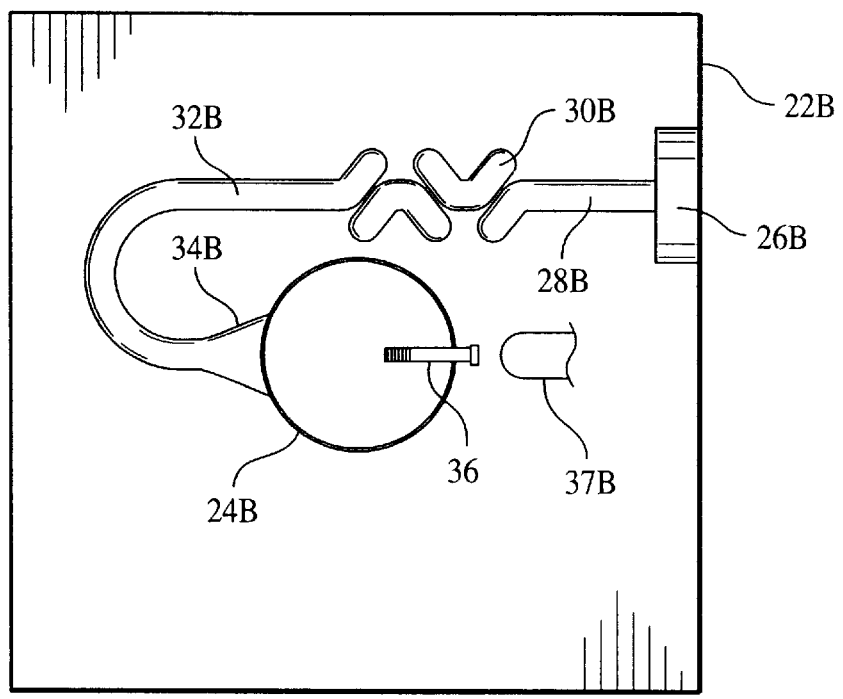
FIG. 4 is a planar view of a portion of the preferred embodiment molding assembly taken along line 4—4 in FIG. 2.

With continuing reference to FIGS. 3 and 4, views 3—3 and 4—4 from FIG. 2, respectively, are provided. These views illustrate additional details of the present invention as embodied in the mold upper and lower halves 22A and 22B. The material inlet channel 28A and 28B allows entry of the constituents which are subsequently directed through the turbulence-promoting channel portion 30A and 30B, which forms the fan gate, then through the connecting channel portion 32A and 32B and to the final channel portion 34A and 34B which leads into the cavity 24A and 24B. The final channel portion 34A and 34B may be defined in several forms extending to the cavity 24A and 24B, including corresponding or complimentary paths which may be closed (34A) or open (34B) and of straight, curved or angular (34A, 34B) shape.

With continuing reference to FIGS. 3 and 4, a pin 36 preferably extends into the central cavity 24A and 24B. In typical injection molding, many pins, often four, six or more, are used to centrally position and retain the core 12 in the molding cavity. It has been discovered that because of the reduced process pressure involved in RIM, fewer pins 36 are necessary in the molding assembly 20 to centrally locate the core 12 in the central cavity 24A and 24B. For example, only three pins may be necessary. The use of fewer pins reduces the cost of the tooling and reduces problems such as defacement and surface imperfections caused by pins. The pins 36 are preferably provided at different locations in the molding assembly 20 and extend into different portions of the central cavity formed by the hemispherical cavities 24A, 24B. A channel 37A and 37B may be provided as either a venting channel or an overflow channel as known in the art. It will be appreciated that when the upper and lower halves 22A and 22B are closed, the respective portions 37A and 37B align with one another to form the venting or overflow channel.

Figure 5:
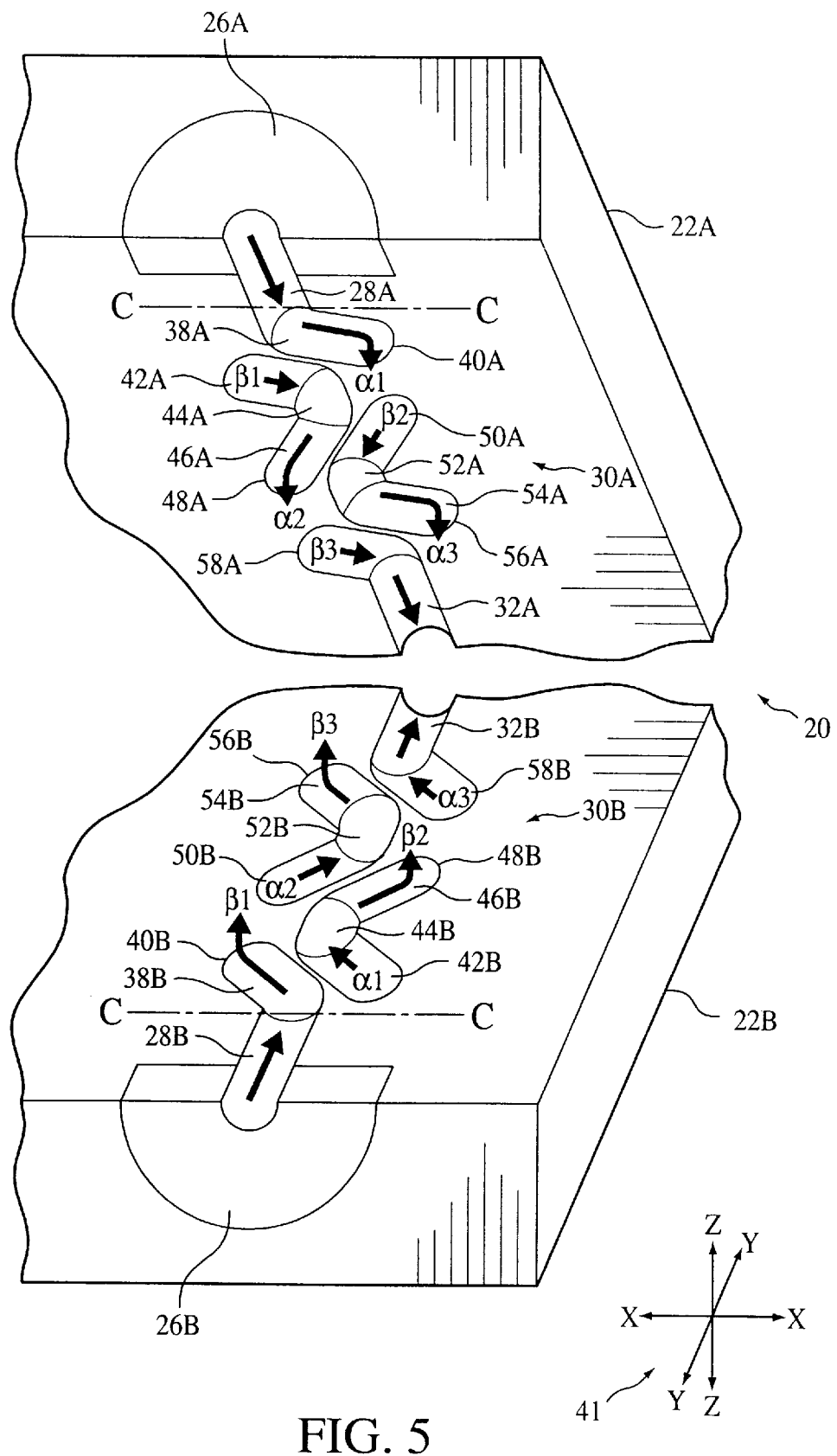
FIG. 5 is a detailed perspective view of a portion of the preferred embodiment molding assembly taken along line 5—5 in FIG. 2. This view illustrates turbulence-promoting fan gate in accordance with the present invention.

Turning now to FIG. 5, a perspective view of the mold body 20 illustrates the details of material flow and mixing provided by the current invention. The body halves 22A and 22B are shown in an open position, i.e., removed from one another, for purposes of illustration only. It will be appreciated that the material flow described below takes place when the halves 22A and 22B are closed. The adapter portion 26A, 26B leads to the inlet flow channel 28A, 28B which typically has a uniform circular cross section of 360°. The flowing material proceeds along the inlet channel 28A, 28B until it arrives in a location approximately at a plane designated by line C—C. At this region, the material is forced to split apart by a branching intersection 38A and 38B. Each half of the branching intersection 38A and 38B is divergent, extending in a direction generally opposing the other half. For example, portion 38A extends upward and 38B extends downward relative to the inlet channel 28A, 28B as shown. Each half of the branching intersection 38A and 38B, in the illustrated embodiment, is semicircular, or about 180° in curvature. The separated material flows along each half of the branching intersection 38A and 38B until it reaches a respective planar wall, 40A and 40B.

At each first planar wall 40A and 40B, the material can no longer continue to flow within the plane of the closed mold, i.e., the halves 22A and 22B being aligned with one another. To aid the present description it will be understood that in closing the mold, the upper half 22A is oriented downward (referring to FIG. 5) so that it is generally parallel with the lower half 22B. The orientation of the halves 22A and 22B in such a closed configuration is referred to herein as lying in an x-y plane. As explained in greater detail herein, the configuration of the present invention fan gate provides one or more flow regions that are transversely oriented to the x-y plane of the closed mold. Hence, these transverse regions are referred to as extending in a z direction.

Specifically, at the first planar wall 40A the material flows from a point $\alpha 1$ in one half 22A to a corresponding point $\alpha 1$ in the other half 22B. Point $\alpha 1$ in half 22B lies at the commencement of a first convergent portion 42B. Likewise, at the first planar wall 40B the material flows from a point $\beta 1$ in one half 22B to a corresponding point $\beta 1$ in the other half 22A. The point $\beta 1$ in half 22A lies at the commencement of a first convergent portion 42A. The first convergent portion 42A and 42B brings the material to a first common area 44A and 44B. In the shown embodiment, each first convergent portion is parallel to each first diverging branching intersection to promote a smooth material transfer. For example, the portion 42A is parallel to the portion 38A, and the portion 42B is parallel to the portion 38B.

With continuing reference to FIG. 5, the flowing material arrives at the first common area 44A and 44B, which has a full circular, i.e., 360°, cross section when the halves 22A and 22B are closed. Essentially, the previously separated material is rejoined in the first common area 44A and 44B. A second branching intersection 46A and 46B which is divergent then forces the material to split apart a second time and flow to each respective second planar wall 48A and 48B. As with the first planar wall 40A and 40B, the material, upon reaching the second planar wall 48A and 48B can no longer flow in an x-y plane and must instead move in a transverse z-direction. For example, at the planar wall 48A, the material flows from a point $\alpha 2$ in one half 22A to a corresponding point $\alpha 2$ in the other half 22B, which lies in a second convergent portion 50B. The material reaching the planar wall 48B flows from a point $\beta 2$ in one half 22B to a corresponding point $\beta 2$ in the other half 22A, which lies in a second convergent portion 50A.

In the shown embodiment, each second convergent portion 50A and 50B, is parallel to each second diverging branching intersection 46A and 46B. For example, the portion 50A is parallel to the portion 46A and the portion 50B is parallel to the portion 46B. The second convergent portion 50A and 50B forces the material into a second common area 52A and 52B to once again rejoin the separated material. As with the first common area 44A and 44B, the second common area 52A and 52B has a full circular cross section.

After the common area 52A and 52B, a third branching intersection 54A and 54B again diverges, separating the material and conveying it in different directions. Upon reaching each respective third planar wall, i.e., the planar wall 56A in the portion 54A and the planar wall 56B in the portion 54B, the material is forced to again flow in a transverse, z-direction from the planar x-y direction. From a point $\alpha 3$ at the third planar wall 56A in one half 22A, the material flows to a corresponding point $\alpha 3$ in the other half 22B, which lies in a third convergent portion 58B. Correspondingly, from a point $\beta 3$ at third planar wall 56B in one half 22B, the material flows to a corresponding point $\beta 3$ in the other half 22A, which is in a third convergent portion 58A.

The turbulence-promoting fan gate structure 30A and 30B ends with a third convergent portion 58A and 58B returning the separated material to the connecting flow channel 32A and 32B. The connecting channel 32A and 32B is a common, uniform circular channel having a curvature of 360°. Once the material enters the connecting channel portion 32A and 32B, typical straight or curved smooth linear flow recommences.

By separating and recombining materials repeatedly as they flow, the present invention provides for increased mixing of constituent materials. Through the incorporation of split channels and transverse flow, mixing is encouraged and controlled while the flow remains uniform, reducing back flow or hanging-up of material, thereby reducing the degradation often involved in non-linear flow. Particular note is made of the angles of divergence and convergence of the fan gate portions 38A and 38B, 42A and 42B, 46A and 46B, 50A and 50B, 54A and 54B and 58A and 58B, as each extends at the angle of about 30° to 60° from the centerline of the linear inlet flow channel 28A, 28B. This range of angles allows for rapid separation and re-convergence while minimizing backflow. In addition, each divergent branching portion and converging portion 38A and 38B, 42A and 42B, 46A and 46B, 50A and 50B, 54A and 54B and 58A and 58B extends from the centerline of the linear inlet flow channel 28A, 28B for a distance of one to three times the diameter of the channel 28A, 28B before reaching its respective planar wall 40A and 40B, 48A and 48B and 56A and 56B. Further note is made of the common areas 44A and 44B and 52A and 52B. These areas are directly centered about a same linear centerline which extends from the inlet flow channel portion 28A, 28B to the commencement of the connecting flow channel portion 32A, 32B. As a result, the common areas 44A and 44B and 52A and 52B are aligned linearly with the channel portions 28A, 28B and 32A, 32B, providing for more consistent, uniform flow. While several divergent, convergent, and common portions are illustrated, it is anticipated that as few as one divergent and convergent portion or as many as ten to twenty divergent and convergent portions may be used, depending upon the application and materials involved.

Figure 6:
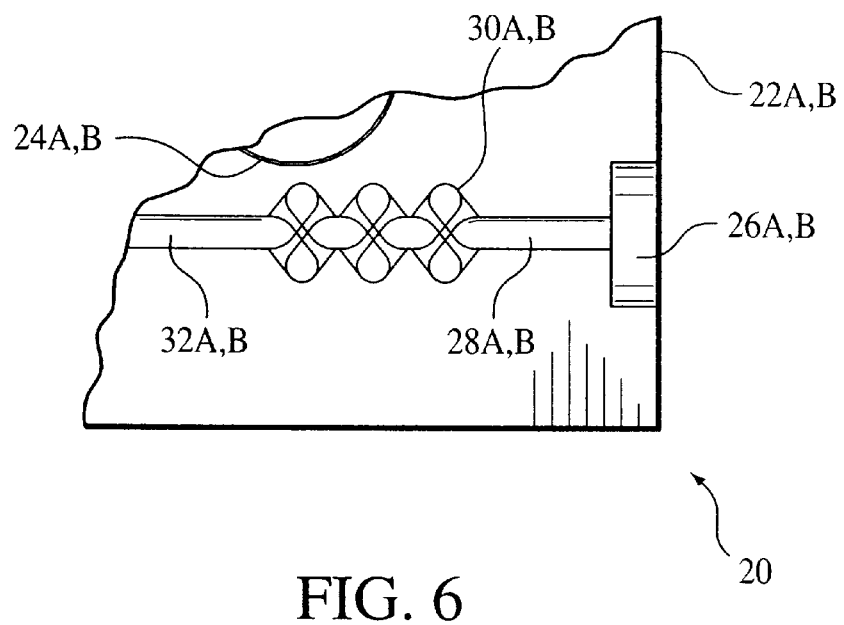
FIG. 6 is a detailed view of the fan gate of the preferred embodiment molding assembly in accordance with the present invention.

FIG. 6 depicts the turbulence-promoting fan gate channels 30A, 30B from a side view when the molding assembly 20 is closed. As described above, upon closure, the upper half 22A and the lower half 22B meet, thereby creating the turbulence-promoting flow gate along the region of the channel portions 30A and 30B. The resulting flow gate causes the constituent materials flowing therethrough to deviate from a straight, generally linear path to a nonlinear turbulence-promoting path. The interaction and alignment of the divergent branching intersections 38A and 38B, 46A and 46B, 54A and 54B (referencing back to FIG. 5), the convergent portions 42A and 42B, 50A and 50B, 58A and 58B, and the common portions 44A and 44B, and 52A and 52B, also as described above, is shown in detail. It is preferred that the fan gate channel portion 30A, 30B be at least one tenth or 10% of the total flow channel length in the molding assembly 20 in order to provide sufficient turbulent flow length for adequate mixing for most constituent materials. That is, it is preferred that the total length of the fan gate, measured along the path of flow along which a liquid traveling through the fan gate flows, is at least one tenth of the total flow length as measured from the commencement of the inlet channel 28A, 28B through the fan gate and through the connecting channel portion 32A, 32B to the end of the final portion 34A and 34B at the mold cavity 24A, 24B. For many applications, it may be preferred that the fan gate length be about 15% to about 35%, and most preferably from about 20% to about 30%, of the total flow path length.

In a particularly preferred embodiment, the fan gate includes a plurality of bends or arcuate portions that cause liquid flowing through the fan gate to not only be directed in the same plane in which the flow channel lies, but also in a second plane that is perpendicular to the first plane. It is most preferable to utilize a fan gate with bends such that liquid flowing therethrough travels in a plane that is perpendicular to both the previously noted first and second planes. This configuration results in relatively thorough and efficient mixing due to the rapid and changing course of direction of liquid flowing therethrough.

Figure 7:
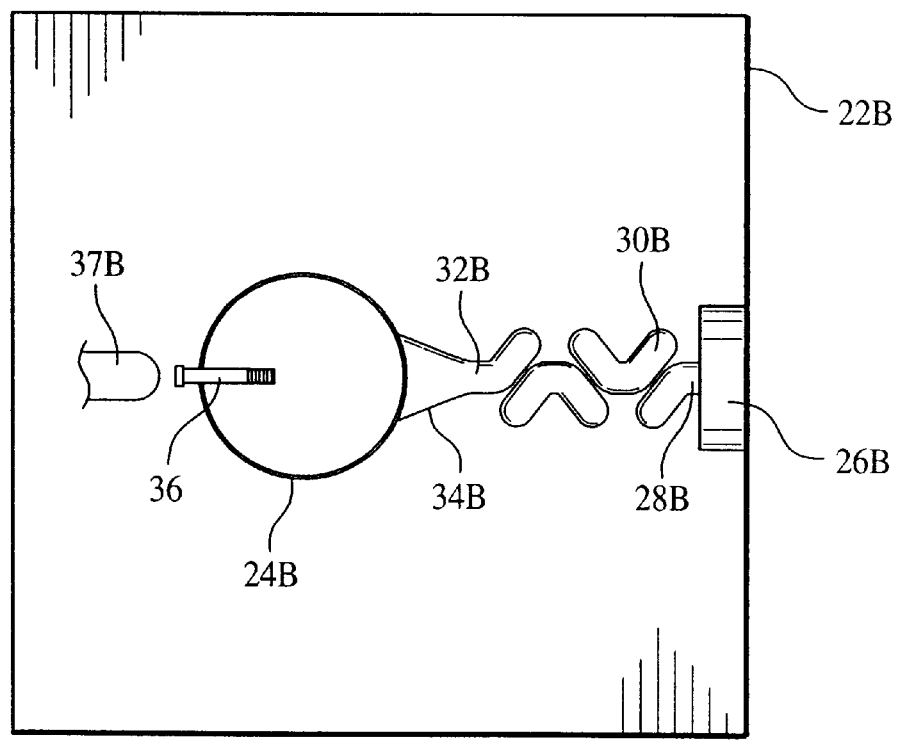
FIG. 7 is a planar view of a portion of an alternative embodiment of the molding assembly in accordance with the present invention.

The configuration of the mold channels may take various forms. One such variation is shown in FIG. 7. Reference is made to the lower mold half 22B for the purpose of illustration, and it is to be understood that the upper mold half 22A (not shown) comprises a complimentary configuration. The adapter portion 26B leads to the inlet flow channel 28B which leads to the turbulence-promoting channel portion 30B. However, instead of the adapter 26B and the channels 28B and 30B being spaced apart from the central cavity 24B, they are positioned approximately in line with the central cavity 24B, eliminating the need for the connecting channel portion 32B to be of a long, curved configuration to reach the final channel portion 34B. Thus, the connecting channel 32B is a short, straight channel, promoting a material flow path which may be more desirable for some applications. The flow channels and the central cavity may be arranged according to other forms similar to those shown, which may occur to one skilled in the art, as equipment configurations and particular materials and applications dictate.

Figure 8:
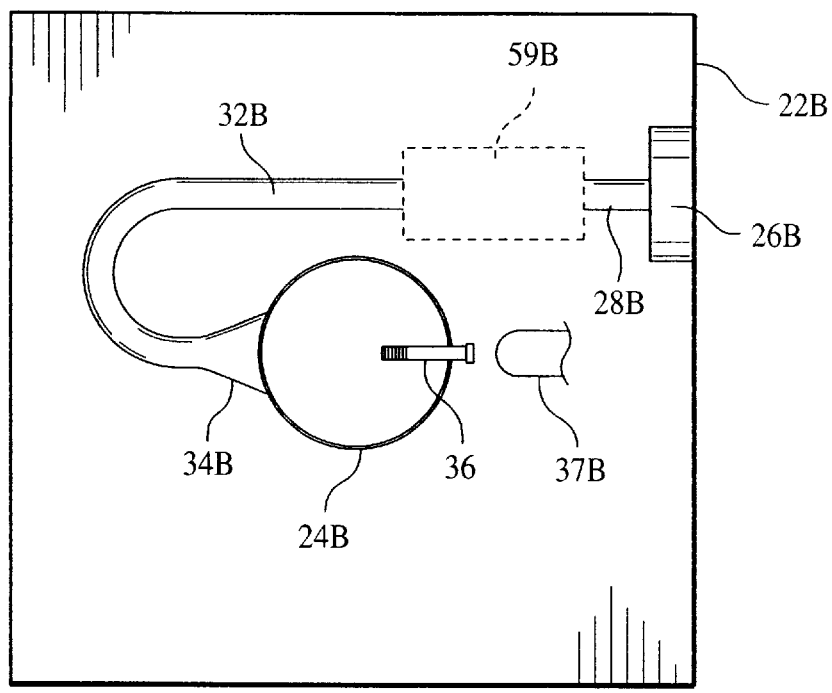
FIG. 8 is a planar view of a portion of an alternative embodiment of the molding assembly in accordance with the present invention.

In the above-referenced figures, the channels 30A and 30B are depicted as each comprising a plurality of angled bends or turns. Turning now to FIG. 8, the channels are not limited to the angled bend-type fan gate configuration and include any turbulence-promoting design located in a region 59B between the adapter portion 26B and the cavity 24B. Again, reference is made to the lower mold half 22B for the purpose of illustration, and it is to be understood that the upper mold half 22A (not shown) is complimentary to the lower mold half 22B. The channels in the turbulence-promoting region 59A (not shown) and 59B could be formed to provide one or more arcuate regions such that upon closure of the upper and lower mold halves 22A and 22B, the flow gate has, for example, a spiral or helix configuration. Regardless of the specific configuration of the channels in the turbulence promoting portion 59A and 59B, the shape of the resulting flow gate insures that the materials flow through the turbulence-promoting region and thoroughly mix with each other, thereby reducing typical straight laminar flow and minimizing any settling in a low-flow area where degradation may occur. And, as previously noted, such thorough mixing of the materials has been found to lead to greater consistency and uniformity in the final physical properties and characteristics of the resulting golf ball layer or component.

Figure 9:
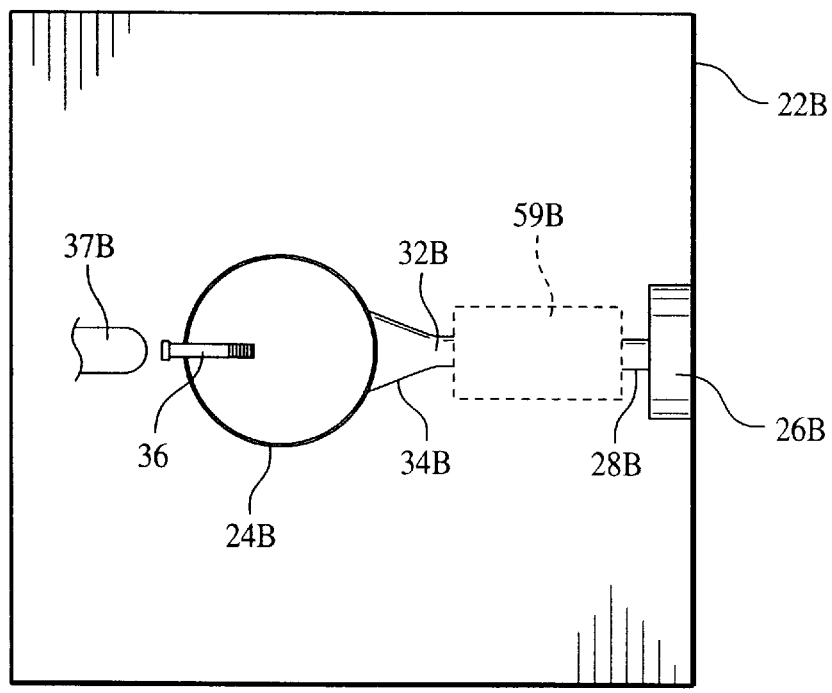
FIG. 9 is a planar view of a portion of an alternative embodiment of the molding assembly in accordance with the present invention.

As shown in FIG. 9, the turbulence-promoting region 59A (not shown) and 59B may be placed in various locations in the upper and lower mold halves 22A (not shown) and 22B. As mentioned above, the turbulence-promoting region 59B and the other flow channel portions 28B, 32B, and 34B may be arranged so as to create an approximately straight layout between the adapter portion 26B and the central cavity 24B. By allowing flexibility in the location of the turbulence-promoting region 59B and the other channel portions 28B, 32B and 34B, as well as the adapter 26B and the central cavity 24B, optimum use may be made of the present invention in different applications.

Figure 10:
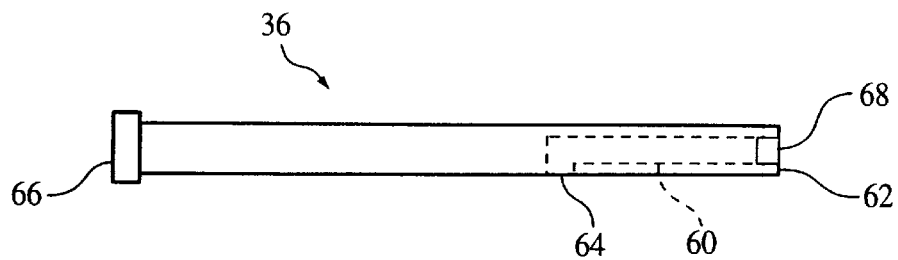
FIG. 10 is a side view of a preferred embodiment pin utilized in the preferred molding assembly according to the present invention.

With reference to FIG. 10, an elevational view of a preferred embodiment pin 36 is shown. As mentioned above, a plurality of pins 36 extend into the central cavity 24A, 24B of the molding assembly 20. The pin 36 may be selectively moveable or retractable from the cavity 24A, 24B as known in the art, in order to facilitate molding of the cover 14 and removal of the golf ball 10 from the molding assembly 20. In the preferred embodiment depicted in FIG. 10, the pin 36 includes a central channel 60 defined along a portion of its interior. Most preferably, the channel 60 is oriented along the longitudinal axis of the pin. Preferably, the channel 60 provides communication between an end 62 of the pin 36 that extends into the central cavity 24A, 24B and a location along the length of the pin 36 that is in communication with the previously noted venting channel or overflow channel 37A, 37B. This arrangement enables the pin 36 to vent gases from the central cavity 24A, 24B into the channel 37A, 37B or other arrangement as known in the art. Venting of gases from central cavity 24A, 24B is carried out by transfer of gases through the channel 60 and an orifice port 64 defined in the body of the pin 36. The gases then pass to channel 37A, 37B or other arrangement as designed. The particular venting arrangement to be applied is often influenced by placement of orifice port 64. For example, channel 60 may instead extend throughout the length of pin 36, defining a vent orifice port in head 66. In addition, channel 60 may be defined by an orifice in pin 36 as shown, or by a porous component extending substantially throughout pin 36.

The pin 36 may further comprise a tip component 68 that is disposed at the end 62 of pin 36. Most preferably, the tip component 68 is positioned at the entrance of the channel 60 at the end of 62. The tip component 68 is structured to allow the passage of gases but prevent the molding materials from entering the channel 60. The tip component 68 may be of a porous material or a solid material including one or more passages large enough to allow the transfer of gas while small enough to prevent passage of RIM materials. The component 68 may also be an integral part of pin 36, or it may be a separate unit which is joined to pin 36 by a manner known in the art, such as press fitting.

Gases, including air and moisture, are often present in a RIM process and create undesirable voids in the molded cover 14. Venting of central cavity 24A, 24B reduces voids by removing these gases. Through the use of vented pins 36 a cover 14 is provided that is significantly more free from voids or other imperfections than a cover produced by a non-vented RIM process.

Figure 11:
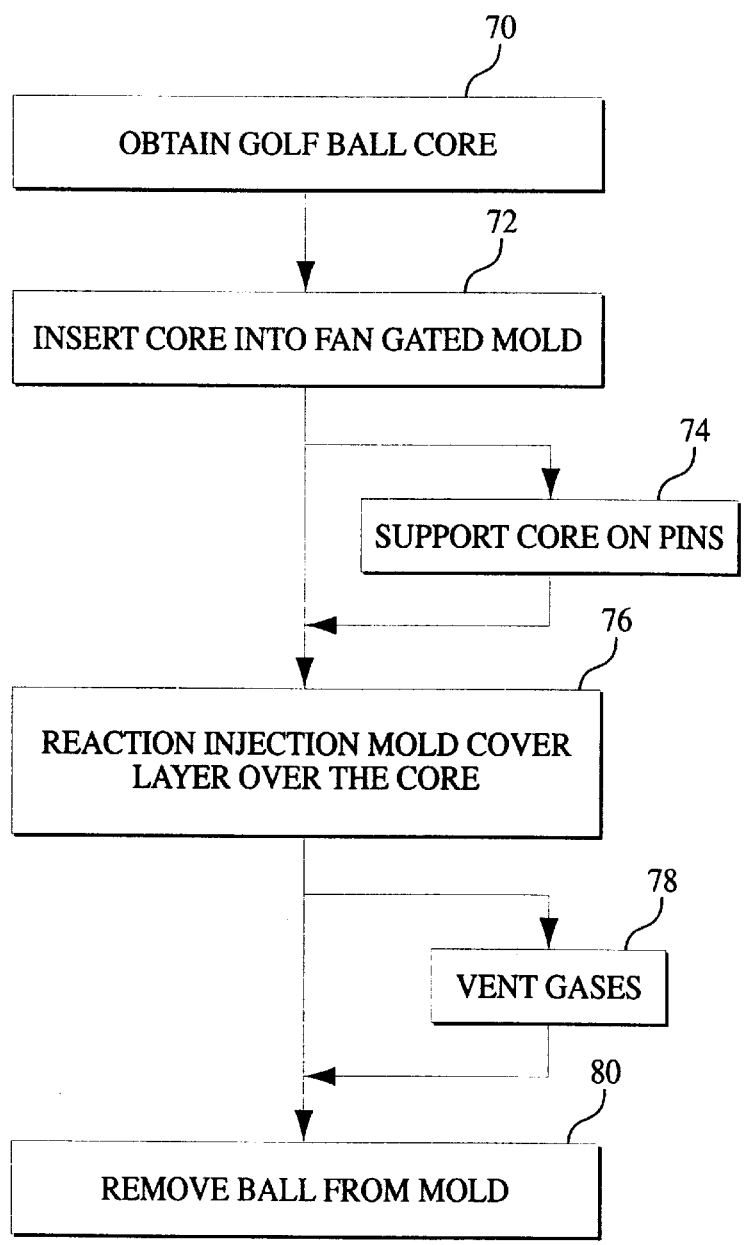
FIG. 11 is a flow chart illustrating a preferred embodiment process in accordance with the present invention.

A preferred method of making a golf ball in accordance with the present invention is illustrated in FIG. 11. A golf ball core 12 made by techniques known in the art is obtained, illustrated as step 70. The core 12 is preferably positioned within a mold having venting provisions and fan gates as described herein. This is illustrated as step 72. If pins are used in the mold, it is preferred that the core 12 is supported on a plurality of the pins. This is shown as step 74. The cover layer 14 is molded over the core 12 by reaction injection molding ('RIM') as step 76. If venting of gases from the molding cavity is desired, such gases are preferably vented through pins as previously described. This is designated as step 78. Should increased removal of gases be desired, the venting of step 78 is enhanced by providing a vacuum connection as known in the art to the venting channel or pins. When the molding is complete, the golf ball 10 is removed from the mold, as shown by step 80.

In accordance with conventional molding techniques, the preferred embodiment molding processes described herein may utilize one or more mold release agents to facilitate removal of the molded layer or component from the mold.

A golf ball manufactured according the preferred method described herein exhibits unique characteristics. Golf ball covers made through compression molding and traditional injection molding include balata, ionomer resins, polyesters resins and polyurethanes. The selection of polyurethanes which can be processed by these methods is limited. Polyurethanes are often a desirable material for golf ball covers because balls made with these covers are more resistant to scuffing and resistant to deformation than balls made with covers of other materials. The current invention allows processing of a wide array of grades of polyurethane through RIM which was not previously possible or commercially practical utilizing either compression molding or traditional injection molding. For example, utilizing the present invention method and Bayer® MP-10000 polyurethane resin, a golf ball with the properties described below has been provided. It is anticipated that other urethane resins such as Bayer® MP-7500, Bayer® MP-5000, Bayer® aliphatic or light stable resins, and Uniroyal® aliphatic and aromatic resins may be used.

Some of the unique characteristics exhibited by a golf ball according to the present invention include a thinner cover without the accompanying disadvantages otherwise associated with relatively thin covers such as weakened regions at which inconsistent compositional differences exist. A traditional golf ball cover typically has a thickness in the range of about 0.060 inches to 0.080 inches. A golf ball of the present invention may utilize a cover having a thickness of about 0.015 inches 0.050 inches. This reduced cover thickness is often a desirable characteristic. It is contemplated that thinner layer thicknesses are possible using the present invention.

Because of the reduced pressure involved in RIM as compared to traditional injection molding, a cover or any other layer of the present invention golf ball is more dependably concentric and uniform with the core of the ball, thereby improving ball performance. That is, a more uniform and reproducible geometry is attainable by employing the present invention.

The present invention is further illustrated by the following examples. It is to be understood that the present invention is not limited to the examples, and various changes and modifications may be made in the invention without departing from the spirit and scope thereof.

EXAMPLE 1

A golf ball of the present invention including a cover of Bayer® MP-10000 polyurethane resin RIM molded at a thickness of 0.035 inches ('RIM A') was compared to a ball with a cover also molded at a thickness of 0.035 inches but of conventional ionomer resin ('Ionomer.'). Also used for comparison were standard balls of the prior art, a Strata Tour® Professional 90™ ball ('Strata®') and a Titleist® Tour Prestige 90™ ball ('Tour Prestige™'). Data based on the comparison is displayed in Table 1.

The data for this Example and Example 2 represents the average data for one dozen balls produced according to the prescribed manner. The properties were measured according to the following parameters:

PGA Compression ('PGA Com.') generally is a measurement of the deformation of a golf ball from thousandths of an inch determined by a force applied to a spring. The equipment for the measurement is manufactured by Atti Engineering, Union City, N.J. Details of measuring PGA compression are set forth in U.S. Pat. No. 5,779,561, herein incorporated by reference.

Coefficient of restitution ('COR') generally is measured by firing the resulting golf ball from an air cannon at a velocity of 125 feet per second against a steel plate which is positioned 12 feet from the muzzle of the cannon. The rebound velocity is then measured. The rebound velocity is divided by the forward velocity to give the coefficient of restitution.

Rebound ('Rbd.') generally is measured by dropping a ball from a fixed height of 100 inches and measuring the maximum height reached in inches after the first impact with the ground.

Cover Hardness ('Cover Hs') is measured on a Shore C scale using Durotronic 2000™ system type C, 10 measurements per ball. Cover hardness is measured by taking the measurement on a land area on the curved surface of the cover layer.

Cut is a ranking from 1 to 6 of the resistance to the ball cover of a cut, 1 being the best. Cut is measured by dropping a 5.9 lb weight from a height of 41" onto a golf ball in a guillotine fashion, i.e., using a tester set up with a guillotine design. The ball is loosely held in a spherical cavity and the guillotine face strikes the approximate middle of the ball surface. The face of the guillotine is approximately 0.125 inches wide by 1.52 inches long and all edges are radiused in a bullnose fashion. The ball is struck in three different locations and is then assigned a ranking based on the degree of damage.

Scuff is also a ranking from 1 to 6, 1 being the best, using a Maltby® Sand Wedge to determine the susceptibility of the ball cover to scuffing from the club. A sharp-grooved Maltby® Sand Wedge with 56 degrees of loft is mounted on the arm of a mechanical swing machine. The sand wedge is swung at 60 miles per hour and hits the ball into a capture net. The ball is hit three times, each time in a different location, and then assigned a ranking based on the degree of damage. The club face of the Maltby® Sand Wedge has a groove width of 0.025 inches, cut with a mill cutter with no sandblasting or post finishing. Each groove is 0.016 inches deep and the space from one groove edge to the nearest adjacent groove edge is 0.105 inches.

Nine iron spin ('9 iron spin'), five iron spin ('5 iron spin') and driver spin are measured by striking the resulting golf balls with a respective club (a nine iron for nine iron spin, a five iron for five iron spin and a driver for driver spin) wherein the club-head speed is about 105 feet per second. The ball is launched at an initial velocity of about 110–115 feet per second at the angle specified in the column designated '9 iron L.A.' for the nine iron spin test, the angle specified in the column designated '5 iron L.A.' for the five iron spin test and the angle specified in the column designation 'driver L.A.' for the driver spin test. The spin rate is measured by observing the rotation of the ball in flight using stop action Strobe photography.

TABLE 1

| Ball | PGA Com. | COR | Rbd. | Cover Hs | Cut | Scuff | 9 iron spin | 9 iron L.A. | 5 iron spin | 5 iron L.A. | Driver spin | Driver L.A. |
|---|---|---|---|---|---|---|---|---|---|---|---|---|
| RIM A | 82.6 | 0.790 | 73.9 | 74.4 | 1 | 3.2 | 9260 | 22.86 | 5233 | 14.67 | 2678 | 9.75 |
| Ionomer | 81.8 | 0.795 | 75.3 | 74.2 | 1.5 | — | 9368 | 23.43 | 5149 | 14.64 | 2492 | 9.91 |
| Strata ® | 77.4 | 0.787 | 73.8 | 71.2 | 1.5 | 4 | 9394 | 23.35 | 5253 | 14.68 | 2858 | 9.74 |
| Tour Pres-tige ™ | 72.3 | 0.764 | 68.8 | 76.7 | 2 | 3 | 9629 | 22.78 | 5910 | 14.00 | 3521 | 9.17 |

As evident in the above data, the golf ball of the present invention exhibits a higher PGA compression than any of the other tested balls, indicating a better response from a club hit. The coefficient of restitution, rebound and spin characteristics of the new ball are better than the Strata® and Tour Prestige™ balls. Although the ionomer ball exhibits some properties which are comparable to the ball of the present invention, the cut resistance of the new ball is significantly better. A golf ball of the present invention exhibits a cut resistance of less than 1.5. As a result, the improved properties of the ball of the present invention are evident.

EXAMPLE 2

A golf ball of the present invention including a cover of Bayer MP-10000 polyurethane resin RIM molded at a thickness of 0.050 inches ('RIM B') was compared to a ball with a cover molded at a thickness of 0.035 inches but of ionomer resin ('Ionomer'). Also used for comparison are standard balls of the prior art, a Strata Tour® Professional 90™ ball ('Strata®') and a Titleist® Tour Prestige 90™ ball ('Tour Prestige™'). Data based on the comparison is displayed in Table 2.

TABLE 2

| Ball | PGA Com. | COR | Rbd. | Cover Hs | Cut | Scuff | 9 iron spin | 9 iron L.A. | 5 iron spin | 5 iron L.A. | Driver spin | Driver L.A. |
|---|---|---|---|---|---|---|---|---|---|---|---|---|
| RIM B | 83.2 | 0.782 | 72.1 | 71.9 | 1 | 3.2 | 9630 | 22.57 | 5654 | 14.40 | 2799 | 9.20 |
| Ionomer | 81.8 | 0.795 | 75.3 | 74.2 | 1.5 | — | 9368 | 23.43 | 5149 | 14.64 | 2492 | 9.91 |
| Strata ® | 77.4 | 0.787 | 73.8 | 71.2 | 1.5 | 4 | 9394 | 23.35 | 5253 | 14.68 | 2858 | 9.74 |
| Tour Pres-tige ™ | 72.3 | 0.764 | 68.8 | 76.7 | 2 | 3 | 9629 | 22.78 | 5910 | 14.00 | 3521 | 9.17 |

This data illustrates the superior compression and cut resistance of a ball of the present invention, while maintaining levels of other desired properties that are similar to those exhibited by balls of the prior art. As shown in Table 2, a golf ball of the present invention exhibits a cut resistance of less than 1.5.

The present invention has been described with reference to the preferred embodiments. Potential modifications and alterations will occur to others upon a reading and understanding of the specification. It is our intention to include all such modifications and alterations insofar as they come within the scope of the appended claims, or the equivalents thereof.

Having thus described the invention, it is claimed:

1. A mold for making a golf ball comprising:
   a mold body defining a molding cavity within the body adapted for retaining a golf ball core positioned therein;
   at least one material flow inlet defined in the mold body;
   at least one material flow channel also defined in the mold body and providing fluid communication between the molding cavity and the material flow inlet; and
   at least a portion of the material flow channel having a plurality of bends and at least one branching intersection, adapted to promote turbulence in a liquid flowing therethrough.

2. The mold of claim 1, wherein the portion of the material flow channel having a plurality of bends is at least 10% of the total flow channel length.

3. The mold of claim 2, wherein the portion of the material flow channel having a plurality of bends is about 15% to about 35% of the total flow channel length.

4. The mold of claim 3, wherein the portion of the material flow channel having a plurality of bends is about 20% to about 30% of the total flow channel length.

5. The mold of claim 1, wherein the molding cavity defines a plurality of raised regions along a surface of the molding cavity that are adapted to form dimples in a cover layer of a golf ball formed therein.

6. The mold of claim 1, wherein the mold further comprises a plurality of selectively moveable pins positioned to extend into the molding cavity.

7. The mold of claim 6, wherein the plurality of pins are retractable so as not to extend into the molding cavity.

8. The mold of claim 6, wherein at least one of the pins defines a venting channel extending from an end of the pin that may be extended into the molding cavity.

9. The mold of claim 8, wherein at least one of the pins includes a tip component disposed proximate the end of the pin and which allows gases to enter the venting channel but prevents liquid from entering the venting channel.

* * * * *